US005958537A

United States Patent [19]

Akhter

[11] Patent Number: 5,958,537

[45] Date of Patent: Sep. 28, 1999

[54] STATIC DISSIPATIVE LABEL

[75] Inventor: Sohail Akhter, Brown Deer, Wis.

[73] Assignee: Brady USA, Inc., Milwaukee, Wis.

[21] Appl. No.: 08/936,932

[22] Filed: Sep. 25, 1997

[51] Int. Cl.[6] .......... B32B 5/16

[52] U.S. Cl. .......... 428/40.2; 283/81; 427/208.4; 427/208.8; 428/40.1; 428/40.9; 428/41.3; 428/41.5; 428/42.1; 428/220; 428/353; 428/354; 428/355; 428/922

[58] Field of Search .......... 428/40.1, 40.2, 428/40.9, 41.3, 41.5, 42.1, 220, 353, 354, 355, 922; 283/81; 427/208.4, 208.8; 156/325

[56] References Cited

U.S. PATENT DOCUMENTS

| | | | |
|---|---|---|---|
| 3,762,946 | 10/1973 | Stow et al. | 117/227 |
| 4,547,311 | 10/1985 | Sako et al. | 252/511 |
| 4,548,862 | 10/1985 | Hartman | 428/323 |
| 4,623,481 | 11/1986 | Huybrechts et al. | 252/511 |
| 4,731,282 | 3/1988 | Tsukagoshi et al. | 428/220 |
| 4,735,847 | 4/1988 | Fujiwara et al. | 428/209 |
| 4,740,426 | 4/1988 | Tremper | 428/423.7 |
| 4,954,389 | 9/1990 | Acharya et al. | 428/212 |
| 4,971,727 | 11/1990 | Takahashi et al. | 252/511 |
| 4,981,544 | 1/1991 | Nordale | 156/252 |
| 5,087,494 | 2/1992 | Calhoun et al. | 428/40 |
| 5,266,617 | 11/1993 | Han | 524/392 |
| 5,275,856 | 1/1994 | Calhoun et al. | 428/40 |
| 5,441,809 | 8/1995 | Akhter | 428/354 |
| 5,447,784 | 9/1995 | Williams et al. | 428/220 |
| 5,478,676 | 12/1995 | Turi et al. | 429/234 |
| 5,599,621 | 2/1997 | Akhter | 428/349 |
| 5,609,969 | 3/1997 | Clatanoff et al. | 428/632 |
| 5,631,079 | 5/1997 | Gutman | 428/327 |
| 5,631,311 | 5/1997 | Bergmann et al. | 523/333 |
| 5,700,623 | 12/1997 | Anderson | 430/256 |

*Primary Examiner*—Nasser Ahmad
*Attorney, Agent, or Firm*—Whyte Hirschboeck Dudek SC

[57] ABSTRACT

Static dissipative labels are described which comprise a polyester or polyimide backing film laminated to a conductive primer layer which in turn is laminated to a pressure-sensitive adhesive layer. The primer layer and adhesive layer contain conductive particles, e.g. metals, and the conductive particles in the adhesive layer are arranged such that they span the thickness of the layer.

19 Claims, 1 Drawing Sheet

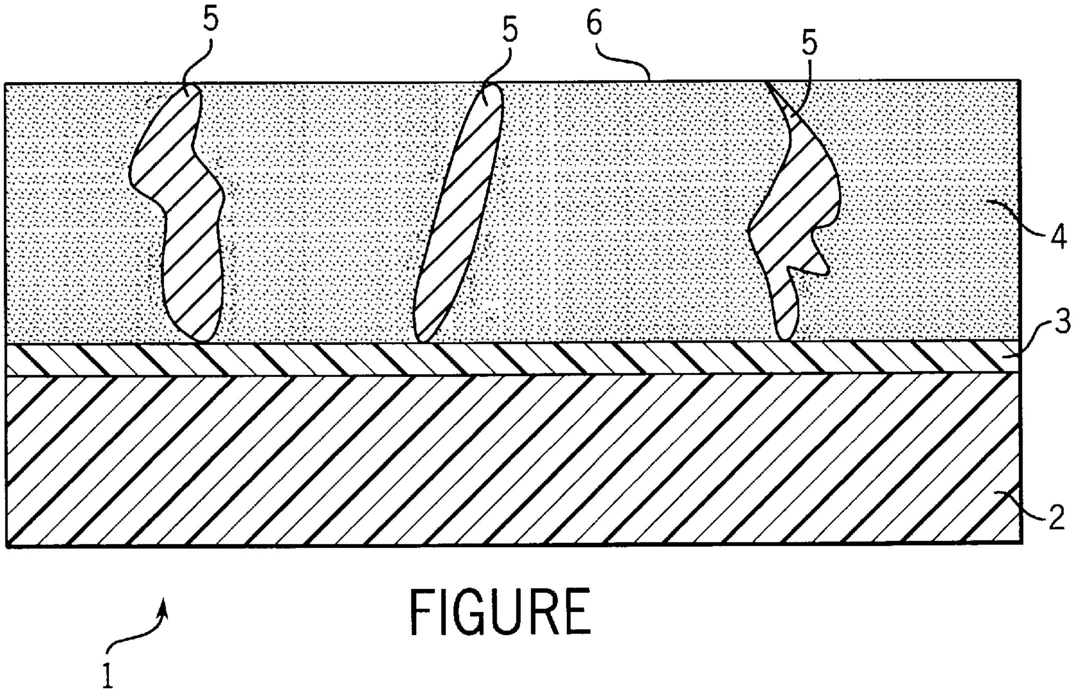
FIGURE

STATIC DISSIPATIVE LABEL

BACKGROUND OF THE INVENTION

This invention relates to labels. In one aspect, the invention relates to labels suitable for application to electronic components, e.g. an integrated circuit chip or a printed circuit board, while in another aspect, the invention relates to labels designed to dissipate static electricity that may be harmful to the electronic component. In yet another aspect, the invention relates to laminated labels comprising a backing film, a primer layer and a pressure-sensitive adhesive layer.

Static dissipation is important for electronic components which are vulnerable to damage from very low voltage (e.g. 50 V) discharges. For example, computer board assemblies contain many static sensitive integrated circuit chips which bear barcode labels that are used for tracking and identification of the boards. These labels are potential sources of static electricity.

Static electricity is generated during application and removal of a label by a phenomenon known as triboelectric charging. Whenever two insulative surfaces rub against one another or are separated from each other, a charge imbalance is generated on each of the surfaces. Since the surfaces are insulative, these charges are not dissipated and thus build to an eventual discharge (which usually appears as a spark). These discharges can destroy the gate oxide layers inside of an integrated chip, thus rendering it useless. Even low voltage discharges which do not generate a visible spark can destroy a modern integrated circuit.

The typical label currently in use for electronic components comprises a backing film one side of which is coated with a pressure-sensitive adhesive and the other side of which is coated with a printable topcoat. The pressure-sensitive adhesive affixes the label to the electronic part while the printable topcoat carries tracking and identifying information about the part. The label is typically provided with a silicone or other suitable liner to protect the pressure-sensitive adhesive until the label is ready for application to the part.

All of the materials from which the label is built are generally insulative or nonconductive in nature. Static electricity is generated at the time the label is peeled from the liner before application to the electronic part, and these charges can exceed hundreds of thousands of volts. During the peeling operation, a danger exists that these charges will discharge and damage the part in the vicinity at which the label is applied. The repositioning or removal of the label is a second triboelectric charging event that also carries the danger of discharge.

To avoid or reduce the risk of these triboelectric charging events, preferably the label is constructed from conductive materials. However since only the adhesive is involved in the peeling process, only the adhesive stores the charge. If the adhesive is conductive, the charge can be dissipated harmlessly.

The standard method of imparting conductivity to an insulative adhesive is to incorporate conductive particles into the adhesive to a loading sufficient to give particle-to-particle contact. However, this is typically accomplished at the cost of adhesiveness loss, i.e. at such conductive particle loadings, the stickiness of the adhesive is compromised.

SUMMARY OF THE INVENTION

According to this invention, a static dissipative label consists essentially of:

A. A polyester or polyimide backing film having opposing first and second surfaces, the first surface adapted to carry printed information;

B. A primer layer having opposing first and second surfaces, the first surface of the primer layer in intimate contact with the second surface of the backing film, the primer layer consisting essentially of:
   1. A phenoxy or polyester binder resin matrix, and
   2. Conductive particles comprising (i) inorganic oxides coated with a conductive material, or (ii) conductive polymers, the conductive particles homogeneously dispersed throughout the binder resin matrix; and C. A pressure-sensitive adhesive layer containing conductive particles which extend from a first surface of the adhesive layer to a second surface of the adhesive layer, and first surface of the adhesive layer in intimate and binding contact with the second surface of the primer layer.

The labels of certain embodiments of this invention have surface resistivities in the $10^6$–$10^{12}$ ohms/square range, and they can dissipate any voltage induced during peeling to less than about 50 V. The conductive particle loading in the adhesive is such that it has little, if any, appreciable effect on the pressure-sensitive quality of the adhesive.

BRIEF DESCRIPTION OF THE DRAWING

The FIGURE is a schematic depiction of a cross-section of one embodiment of a label tape of this invention.

DESCRIPTION OF THE PREFERRED EMBODIMENT

The labels of this invention comprise three basic components, i.e. a backing film, a primer layer and a pressure-sensitive adhesive. Both the primer layer and pressure-sensitive adhesive layer comprise two elements. The primer layer comprises a resin matrix in combination with conductive particles, and the adhesive layer comprises an adhesive in combination with conductive particles.

The backing film is made of a polyimide or polyester polymer. Films made of a polyimide polymer, i.e. polymers having a —CONHCO— group in the polymer chain, are preferred in applications in which the label is expected to experience temperatures in excess of about 150 C. Representative films made of a polyimide polymer include those sold under the Kapton brand by E. I. Du Pont de Nemours, Co. and under the Upilex brand by Ube Co. Films made of a polyester polymer, i.e. polymers having a —CORCO— group in the polymer chain (in which R is any divalent hydrocarbyl or substituted hydrocarbyl radical), are preferred in applications in which the label is expected to experience temperatures less than about 150 C. Representative films made of a polyester polymer include those sold under the Mylar brand by E. I. Du Pont de Nemours, Co. Both the polyimide and polyester films are available in various grades and thicknesses. Typically the film is between 0.5 and 5, preferably between 0.75 and 2 mils, in thickness, and it is at least partially transparent.

Optionally, the surface of the backing film not in contact with the conductive primer layer can carry a coating or topcoat which facilitates the marking of information (e.g. barcodes, alphanumeric characters, etc) onto the film, e.g. it is thermal transfer printable. These topcoats are designed to resist extreme solvent and/or abrasion exposure, and preferably also demonstrate excellent resistance to harsh fluxing, wave solder environments and print smearing. Illustrative topcoats include hydroxyl-bearing polyester resins such as Morester 49003 (manufactured and sold by Morton International Co.) crosslinked with an isocyanate, e.g. N-100 (manufactured and sold by Bayer Co.) and containing a pigment, e.g. titanium dioxide, for opacity.

The primer layer is composed of a binder resin and dispersed conductive particles at a loading sufficient to render the primer layer conductive. The binder resin is selected such that it strongly adheres to the backing film, and it typically has a glass transition temperature (e.g. typically of at least about 25, preferably of at least about 90 C) such that it can withstand elevated temperatures (e.g. temperatures in excess of 200 C) without significant softening, i.e. without oozing from the label. The binder resin also has a good affinity for the conductive particles such that the particles remain well dispersed within the resin over the life of the label. Moreover, the binder resin should exhibit good resistance to the chemicals to which the label may be exposed during the processes in which the electronic component is made or used.

Phenoxy and polyester resins are the preferred binder resins used in the practice of this invention. Preferred phenoxy resins are the linear copolymers made from bisphenol A and epichlorohydrin and which are available from Phenoxy Associates under the brand Phenoxy PKHH. Preferred polyester resins are those available from Morton International Co. under the brand Morester, e.g. Morester 49021. The many grades of both of these resins can be used in the practice of this invention.

The conductive particles which are dispersed within the binder resin are preferably one or more of the following: (i) metal or metal-coated particles, (ii) carbon or graphite particles, (iii) inorganic oxide particles with a conductive shell (commonly known as core-shell electroconductive pigments), and (iv) conductive polymers in either particle or an interconnected network form (the latter usually achieved when the conductive polymer is soluble in the binder resin). These particles are further described in U.S. Pat. No. 5,441,809 which is incorporated herein by reference, and they are used in sufficient amounts such that particle-to-particle contact is made essentially throughout the binder resin thus rendering the resulting combination (i.e. binder with dispersed conductive particles) conductive. Typically, the conductive particles comprise at least about 30, preferably at least about 40 and more preferably at least about 50, weight percent of the combined weight of the binder resin and conductive particles.

Many metal or metal-coated particles are available for use in this invention. Metal particles include those of silver, gold, copper, nickel, aluminum, iron and steel, and metal-coated particles include those in which one or more of these or other metals are coated on a core material such as carbon, graphite, polymeric or glass spheres or another metal. The conductive particle for use in a particular binder resin and label application is chosen based on a number of factors not the least of which are cost, loading requirements and the amount of surface resistivity the particle imparts to the primer layer (preferably at least about 106 ohms/square).

Preferred conductive particles are the core-shell particles in which a nonconductive core (usually an oxide or mineral particle) carries a thin outer shell of a conductive material. Examples include the Zelec brand of conductive pigments from E. I. Du Pont de Nemours, Co. in which the core is either a titanium dioxide particle or mica flake and the conductive outer shell is antimony doped tin oxide. Zelec ECP 3410T (which has a titanium dioxide core) is a preferred conductive particle.

Polyaniline as available from Monsanto Co. is representative of the conductive polymers in particle or soluble form that can be used in the practice of this invention.

As a practical matter, the thickness of the primer layer is kept to a minimum, and it is typically less than about 15, preferably less than about 10 and more preferably less than about 5, microns ($\mu$m). The minimum thickness is that which will not compromise its adhesion to the backing film, and a typical minimum thickness is about 2 $\mu$m.

One surface of the primer layer is affixed to one surface of the backing film (the surface opposing the surface adapted to carry printed information), and the other (opposing) surface of the primer layer is affixed to the pressure-sensitive adhesive. In effect, the primer layer is the middle layer of a three-layer laminate.

The adhesive layer is a combination of a pressure-sensitive adhesive and a low-loading (e.g. typically less than 9, preferably less than about 6 and more preferably less than about 3, weight percent based on the combined weight of the pressure-sensitive adhesive and the particles) of conductive particles. Any conductive particles, including those described with respect to the primer layer, which are of sufficient average particle size so that a sufficient number of such particles will bridge the top and bottom face surfaces (i.e. those in contact with the primer layer and liner (or the electronic component, as the case may be)) of the adhesive layer after conventional blending (e.g. stirring, shaking, etc.) with the adhesive so as to impart to the label (the other components of which are constructed as described in this specification) a surface conductivity of at least about $10^6$ ohms/square can be used in the practice of this invention. Metallic conductive particles, e.g. nickel as available from Novamet Co. under the brand Novarnet 525, are the preferred conductive particles because only a very low loading, e.g. less than about 2 weight percent, is required to obtain the desired surface conductivity, i.e. at least about $10^6$ ohms/square. Other conductive particles, e.g. core-shell, carbon, etc., typically require a higher loading to achieve the same surface conductivity.

Although both can be used, releasable, as opposed to nonreleasable or permanently affixing, pressure-sensitive adhesives are the preferred adhesives for use in this invention. Releasable pressure-sensitive adhesives allow for repositioning of a label after it has been secured to the surface of an electronic component. Acrylic and rubber-based pressure-sensitive adhesives are representative of the various types of adhesives that can be used in this invention but for reasons of temperature stability and high shear strength, the acrylic-based adhesives are preferred. Gelva 1753 from Monsanto Co. and Polytac 303T from H & N Chemicals are preferred acrylic-based permanent (i.e. nonreleasable) pressure-sensitive adhesives. Other examples of permanent adhesives are Gelva 2887 and Aroset 1085 from Ashland Company. Examples of releasable acrylic adhesives include Polytac 415, 301 and 351 from H & N Chemicals.

The thickness of the pressure-sensitive adhesive layer is typically at least about 15, preferably at least about 20 and more preferably at least about 25, $\mu$m and it typically does not exceed about 75, preferably it does not exceed about 60 and more preferably it does not exceed about 50, $\mu$m.

One embodiment of a label of this invention is further described by reference to the FIGURE which depicts a label 1 in cross-section. The label comprises a polymeric backing film 2 coated on one side with a thin conductive primer layer 3 (the conductive particles or polymer within the primer layer not shown). Pressure-sensitive adhesive 4 is coated on the other side of conductive primer layer 3, and dispersed within the adhesive are conductive particles 5. Conductive particles 5 bridge or span the height or depth of adhesive 4 such that they serve as conductive bridges from open surface 6 to conductive primer layer 3. The surface of backing film 2 opposite primer layer 3 optionally is coated with a material (not shown) that facilitates the printing or other imparting of information onto that surface of the label.

The labels of this invention are constructed and used in the same manner as known laminated labels. Conductive particles are dispersed into the conductive primer and the pressure-sensitive adhesive in any convenient manner to obtain a relatively homogeneous dispersion, and the conductive primer layer is then applied to a surface of the backing film (and if one surface of the backing film carries a coating to facilitate the printing of information onto the film, then opposite that surface) and once applied, the pressure-sensitive adhesive is applied to the exposed side of the primer layer in any convenient manner, e.g. spraying, dipping, roll coating, etc. The completed labels are then stored in any conventional manner, e.g. on silicone-coated liners with the exposed face of the pressure-sensitive adhesive layer in contact with the silicone-coated liner. The labels can be imprinted with the desired tracking and identifying information at any convenient time, e.g. prior to, during or after storage (i.e. at the time of use). For use, the labels are simply removed from the storage sheet and applied to the part either by hand or by machine.

The following example is illustrative of one specific embodiment of this invention. Unless otherwise noted, all parts and percentages are by weight.

SPECIFIC EMBODIMENT

A label with a three layer design is constructed from the following materials:

| LAYER | COMPONENT | AMOUNT |
|---|---|---|
| Backing Film | Kapton Polyimide (2 mil) | — |
| Conductive Primer | Phenoxy Resin | 33.33 parts |
| | Zelec ECP 3410T Conductive Pigment | 66.67 parts |
| | Primer Coat Weight | 2.28 lb/ream |
| Pressure-Sensitive Adhesive | Gelva 1753 | 306.25 parts |
| | Novamet 525 Nickel Pigment | 2.00 parts |
| | Adhesive Coat Weight | 28.05 lb/ream |

The primer solution is made by dissolving the phenoxy resin in a suitable solvent, e.g. cyclohexanone, at room temperature and slowly adding the pigment while the solution is agitated with a Cowles™ blade mixer. The adhesive solution is made by dispersing 2 percent by weight of Nickel 525 in Gelva 1753 while under agitation.

The primer coating is applied to the backing film by either gravure cylinder or wirewound rod. The primed film then passes through a series of drying ovens after which the film is rolled and ready for receiving the adhesive coating.

The adhesive coating is applied either by slot-die or reverse roll coating. The adhesive is applied to the primer surface after which the film is passed through a series of drying ovens at the end of which a silicone release liner paper is laminated to it. The adhesive coated film is finally slit to the appropriate size and then converted into small labels by rotary die cutting.

The surface resistivity of the primer layer is measured by cutting a 4×4 inch sheet and placing the sheet face down onto the probe of a Hewlett Packard 16008A Resistivity Cell connected to a Hewlett Packard 4329A High Resistance Meter. After closing the cell chamber and letting the film charge to 100 V, the resistivity of the pressure sensitive adhesive is measured in a similar manner after removing the release liner. The measured value is $1.04\times10^{8}$ ohms/square.

The triboelectric voltage generated during peeling of the label from the liner is measured by removing the release liner and placing the pressure sensitive adhesive side of the label approximately one inch from the charge probe of a 3M 711 Charge Analyzer. The measurement is taken immediately, and it is 10 V.

Although the invention has been described in considerable detail through the preceding example, this detail is for the purpose of illustration only. Many variations and modifications can be made by one skilled in the art without departing from the spirit and scope of the invention as described in the appended claims.

What is claimed is:

1. A static dissipative label consisting essentially of:

A. A polyester or polyimide backing film having opposing first and second surfaces, the first surface adapted to carry printed information;

B. A primer layer having opposing first and second surfaces, the first surface of the primer layer in intimate contact with the second surface of the backing film, the primer layer consisting essentially of:

1. A phenoxy or polyester binder resin matrix, and
2. Conductive particles comprising (i) inorganic oxides coated with a conductive material, or (ii) conductive polymers, the conductive particles homogeneously dispersed throughout the binder resin matrix; and C. A pressure-sensitive adhesive layer containing conductive particles which extend from a first surface of the adhesive layer to a second surface of the adhesive layer, and first surface of the adhesive layer in intimate and binding contact with the second surface of the primer layer.

2. The label of claim 1 in which the backing film is made from a polyimide.

3. The label of claim 2 in which the backing film is between about 0.5 and about 5 mils in thickness.

4. The label of claim 1 in which the conductive particles of the primer layer comprise at least about 30 weight percent of the combined weight of the binder resin and conductive particles.

5. The label of claim 4 in which the binder resin is a phenoxy polymer.

6. The label of claim 5 in which the conductive particles of the primer layer are inorganic oxide particles carrying a conductive shell.

7. The label of claim 6 in which the primer layer is between about 2 and about 15 microns in thickness.

8. The label of claim 1 in which the pressure-sensitive adhesive is a releasable pressure-sensitive adhesive.

9. The label of claim 1 in which the pressure-sensitive adhesive is a nonreleasable pressure-sensitive adhesive.

10. The label of claim 1 in which the conductive particles of the pressure sensitive adhesive layer are metal particles.

11. The label of claim 10 in which the metal particles are nickel particles.

12. The label of claim 10 in which the metal particles comprise less than about 9 weight percent of the combined weight of the metal particles and pressure-sensitive adhesive of the adhesive layer.

13. The label of claim 12 in which the pressure-sensitive adhesive layer is between about 15 and 75 microns in thickness.

14. A static dissipative label consisting essentially of:

A. A polyester or polyimide backing film having opposing first and second surfaces, the first surface adapted to carry printed information;

B. A primer layer having opposing first and second surfaces, the first surface of the primer layer in intimate contact with the second surface of the backing film, the primer layer consisting essentially of:

1. A phenoxy or polyester binder resin matrix, and
2. Conductive particles comprising (i) inorganic oxides coated with a conductive material, or (ii) conductive polymers, the conductive particles homogeneously dispersed throughout the binder resin matrix; and C. A pressure-sensitive adhesive layer having a thickness in the range from about 15 to about 75 microns and containing conductive particles which extend from a first surface of the adhesive layer to a second surface of the adhesive layer, and the first surface of the adhesive layer is in intimate and binding contact with the second surface of the primer layer, the conductive particles of the adhesive layer comprising less than 9 weight percent of the combined weight of the conductive particles and pressure-sensitive adhesive in the adhesive layer.

15. The label of claim 14 in which the conductive particles of the primer layer comprise at least about 30 wt. % of the combined weight of the binder resin and conductive particles.

16. The label of claim 15 in which the conductive particles of the primer layer are inorganic oxide particles carrying a conductive shell and the conductive particles of the adhesive layer are metal particles.

17. A process for making a static dissipative label comprising:

A. Providing a polyester or polyimide backing film having opposing first and second surfaces;

B. Applying a primer to the second surface of the backing film to form a primer layer in intimate contact with the second surface of the backing film, the primer layer consisting essentially of:

1. A phenoxy or polyester binder resin matrix, and
2. Conductive particles comprising (i) inorganic oxides coated with a conductive material, or (ii) conductive polymers, the conductive particles homogeneously dispersed throughout the binder resin matrix; and C. Applying a pressure-sensitive adhesive containing conductive particles to the primer layer formed in step B to form a pressure-sensitive adhesive layer having a first surface and a second surface, the first surface of the adhesive layer in intimate and binding contact with the primer layer and the conductive particles extending from the first surface of the adhesive layer to the second surface of the adhesive layer.

18. The process according to claim 17 in which the pressure-sensitive adhesive is applied according to step C to a thickness sufficient to make a pressure-sensitive adhesive layer having a thickness in the range from about 15 to about 75 microns.

19. The process according to claim 17 in which the conductive particles of the pressure-sensitive adhesive used in step C are metal and comprise less than 9 wt. % of the combined weight of the conductive particles and adhesive.

* * * * *